(12) United States Patent
Juestel et al.

(10) Patent No.: US 6,734,631 B2
(45) Date of Patent: May 11, 2004

(54) LOW-PRESSURE GAS DISCHARGE LAMP WITH PHOSPHOR COATING

(75) Inventors: Thomas Juestel, Aachen (DE); Rainer Hilbig, Aachen (DE); Claus Feldmann, Aachen (DE); Hans-Otto Jungk, Langerwehe-Hamich (DE); Walter Mayr, Alsdorf (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/175,424

(22) Filed: Jun. 19, 2002

(65) Prior Publication Data

US 2003/0011310 A1 Jan. 16, 2003

(30) Foreign Application Priority Data

Jun. 20, 2001 (DE) .......................... 101 29 630

(51) Int. Cl.$^7$ ................................ H01J 17/20
(52) U.S. Cl. ................ 313/640; 313/640; 313/486; 313/487; 313/573; 313/483; 313/635; 313/637; 313/512; 313/639
(58) Field of Search ................. 313/640, 635, 313/637, 639, 512, 483, 486, 487, 573

(56) References Cited

U.S. PATENT DOCUMENTS

| | | | | |
|---|---|---|---|---|
| 5,266,866 A | * | 11/1993 | Takagi et al. | 313/607 |
| 5,663,611 A | * | 9/1997 | Seats et al. | 313/584 |
| 5,939,826 A | * | 8/1999 | Ohsawa et al. | 313/582 |
| 6,398,970 B1 | * | 6/2002 | Justel et al. | 210/748 |
| 6,611,099 B1 | * | 8/2003 | Murata et al. | 313/582 |
| 2001/0033133 A1 | * | 10/2001 | Justel et al. | 313/486 |
| 2002/0190669 A1 | * | 12/2002 | Juestel et al. | 315/326 |

FOREIGN PATENT DOCUMENTS

| | | | | |
|---|---|---|---|---|
| DE | 19737920 | | 3/1999 | ........... H01J/61/34 |
| JP | 9-263756 | * | 7/1997 | ........... H01J/11/00 |

* cited by examiner

*Primary Examiner*—Ashok Patel
*Assistant Examiner*—Holly Harper

(57) ABSTRACT

A low-pressure gas discharge lamp comprising a gas discharge vessel with a gas filling containing mercury, and comprising electrodes, means for igniting and maintaining a gas discharge, and a phosphor coating containing at least one phosphor layer and a UV-C phosphor and a phosphor that can be excited by UV-C radiation.

9 Claims, 1 Drawing Sheet

LOW-PRESSURE GAS DISCHARGE LAMP WITH PHOSPHOR COATING

Figure 1:
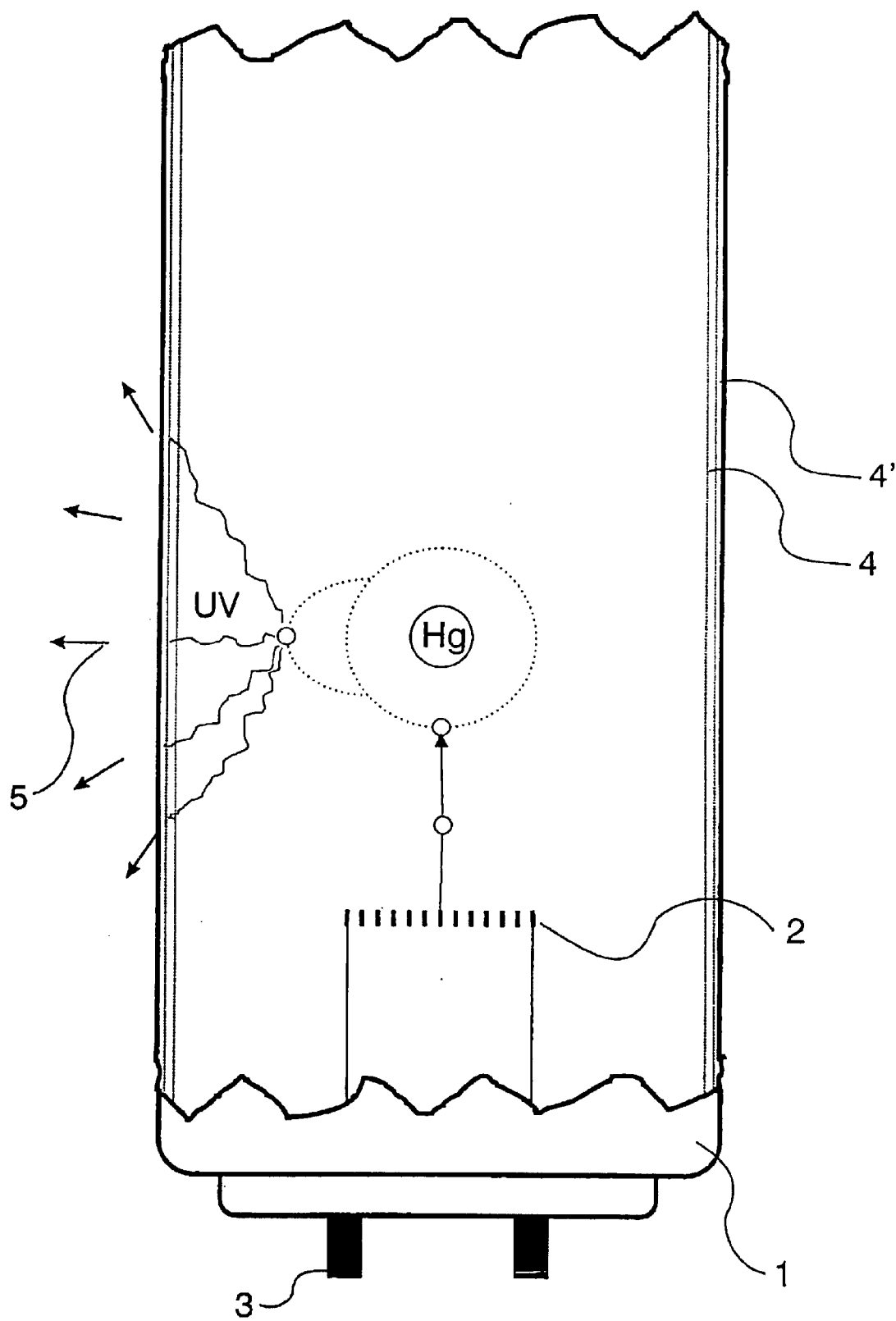

The invention relates to a low-pressure gas discharge lamp, in particular a mercury low-pressure gas discharge lamp, comprising a gas discharge vessel with a gas filling containing mercury, and comprising a phosphor coating, electrodes and means for igniting and maintaining a gas discharge.

Light generation in mercury low-pressure gas discharge lamps is based on the principle that during the gas discharge a plasma develops in the mercury-containing gas filling, which plasma does not only emit a percentage of visible light but also a very high percentage of short-wave UV radiation. The phosphors in the phosphor coating of the lamp absorb this UV radiation and re-emit it as visible light.

In this process, the phosphors are the last member of the energy transfer chain in which electric energy is converted in the lamp into visible light. The efficiency of a low-pressure gas discharge lamp with a phosphor layer thus decisively depends on the electro-optical efficiency of the phosphor, i.e. the extent to which the generated UV light is completely absorbed in the phosphor and the extent to which the generated visible light subsequently leaves the lamp in the direction of the observer.

A drawback of known mercury low-pressure gas discharge lamps resides in that the action of short-wave UV radiation on the phosphor coating as well as the recombination of mercury ions and electrons on the phosphor surface or the incidence of excited mercury atoms and electrons on the phosphor layer cause the emissivity of the phosphors, particularly of $BaMgAl_{10}O_{17}:Eu^{2+}$, to decrease in the course of time. This manifests itself as a reduction of the electro-optical efficiency in the course of the service life.

This degradation is particularly substantial under the influence of VUV radiation having a wavelength below 200 nm, and it does not only manifest itself as a deterioration of the electro-optical efficiency but also by a shift of the color point.

DE 197 37 920 describes that degradation of the phosphors in a low-pressure gas discharge lamp can be reduced in that the discharge vessel forms an inner bulb that is transparent to electromagnetic radiation, which inner bulb is surrounded by an outer bulb, and the inside of the outer bulb and/or the outside of the inner bulb is provided with a phosphor layer.

In this manner it is precluded that recombination of mercury ions and electrons on the phosphor surface, or the incidence of excited mercury atoms and electrons on the phosphor layer causes the emissive power of the phosphor to be reduced in the course of time. Degradation of the phosphors due to the action of short-wave UV radiation, however, is not influenced thereby.

Therefore, it is an object of the invention to provide a low-pressure gas discharge lamp with a phosphor coating, in which degradation of the phosphors during the service life of the lamp is reduced.

In accordance with the invention, this object is achieved by a low-pressure gas discharge lamp comprising a gas discharge vessel with a gas filling containing mercury, and comprising electrodes, means for igniting and maintaining a gas discharge, and a phosphor coating containing at least one phosphor layer and a UV-C phosphor and a phosphor that can be excited by UV-C radiation.

The UV-C phosphor in the phosphor coating acts like a converter. It absorbs the portion of mercury radiation in the high-energy VUV range with an emission maximum at approximately 185 nm and emits radiation in the longer UV-C wavelength range of 230 to 280 nm. As a result, degradation of phosphors by the high-energy VUV radiation is precluded.

Within the scope of the invention it is preferred that the UV-C phosphor comprises an activator selected among the group consisting of $Pb^{2+}$, $Bi^{3+}$ and $Pr^{3+}$ in a host lattice.

These UV-C radiation-emitting phosphors combine a very good absorption in the VUV range with a high absorption coefficient $\epsilon=10,000$ l/cm·mol to $100,000$ l/cm·mol and an emission quantum yield >90%. Unlike other phosphors, they are hardly degraded by the VUV radiation.

It may be preferred that the UV-C phosphor comprises $Pr^{3+}$ and $La^{3+}$. These phosphors emit UV-C radiation comprising two bands in the wavelength range between 220 and 265 nm. The absorption maximum of halophosphate phosphors and three-band phosphor mixtures is found in said wavelength range.

It may also be preferred that the UV-C phosphor comprises $Pr^{3+}$ and $Y^{3+}$.

It is particularly preferred that the UV-C phosphor is selected among the group consisting of $LaPO_4:Pr$, $LaBO_3:Pr$, $LaB_3O_6:Pr$, $YBO_3:Pr$, $YPO_4:Pr$ and $Y_2SiO_5:Pr$.

Particularly advantageous effects of the invention in relation to the state of the art are obtained when the UV-C phosphor is selected among the group consisting of $YPO_4:Bi$ and $LuPO_4:Bi$. These UV-C phosphors are transparent to visible radiation and Hg emission at 254 nm.

Within the scope of the invention it is preferred that the phosphor that can be excited by UV-C radiation contains an activator selected among the group consisting of Ce(III), Tb(III), Eu(II), Mn(II) and Sb(III). These phosphors with the oxidizable activator ions Ce(III), Tb(III), Mn(II), Eu(II) and Sb(III) are particularly affected by a degradation through photo-oxidation and profit to a particular extent from the invention.

In accordance with an embodiment of the invention, the UV-C phosphor is present in a first phosphor layer and the phosphor that can be excited by UV-C radiation is present in a second phosphor layer.

In accordance with a preferred embodiment of the invention, the UV-C phosphor has a grain size of 10 nm<d<500 nm and is present in a first phosphor layer, and the phosphor that can be excited by UV-C radiation is present in a second phosphor layer.

A phosphor layer containing a UV-C phosphor having a grain size in the nano-range forms a very dense layer that satisfactorily shields the phosphor that can be excited by UV-C radiation from the VUV radiation originating from the mercury plasma. In addition, this very dense layer causes the recombination of mercury ions and electrons on the surface of the phosphor layer to be reduced.

These and other aspects of the invention will be apparent from and elucidated with reference to the embodiment(s) described hereinafter.

In the drawing:

FIG. 1 shows an example of a low-pressure gas discharge lamp with a mercury filling, i.e. a fluorescent lamp with two phosphor layers.

In this embodiment of the invention, the gas discharge lamp is composed of a rod, ring or U-shaped tubular lamp bulb 1, which forms the gas discharge vessel for the low-pressure mercury gas discharge. At both ends of the inner bulb, electrodes 2 are sealed in, via which electrodes the gas discharge can be ignited. Two-pin caps 3 serve as the connection means. Apart from an inert gas filling of argon, the glass tube comprises a small quantity of mercury or mercury vapor, which, if rendered luminescent under operating conditions, emits the Hg resonance lines at approximately the following wavelengths: 185.0 nm, 253.7 nm, 406 nm and 436 nm.

A phosphor coating composed of two phosphor layers proved to be advantageous.

In the embodiment of the invention shown in FIG. 1, the inside of the glass tube is provided with a first phosphor layer 4. Said first phosphor layer 4 contains a UV-C radiation-absorbing phosphor or a UV-C radiation-absorbing phosphor mixture. The inside of the first phosphor layer is provided with a second phosphor layer 4' containing a UV-C phosphor. The inner phosphor layer containing a UV-C phosphor shields the outer phosphor layer from radiation originating from the mercury discharge. This applies, in particular, when the UV-C phosphor has a grain size in the nano-range, so that this phosphor layer is very dense and closed.

Alternatively, the phosphor coating may consist of a phosphor layer on the inner wall of the gas discharge vessel, which phosphor layer contains the UV-C phosphor together with the phosphor that can be excited by UV-C radiation. In this embodiment, the UV-C phosphor can replace the filling agent, which is customarily added to the phosphor layer, to obtain a uniform light radiation. This applies particularly when a phosphor with a grain size in the nano-range is used as the UV-C phosphor.

Preferably, the UV-C phosphor is added in a quantity of 5 to 20% by weight with respect to the phosphor coating.

The low-pressure mercury discharge lamp further comprises means for generating and maintaining a low-pressure mercury gas discharge, such as a choke and a starter.

The UV-C phosphor is a phosphor whose absorption maximum lies in the VUV range between 105 and 200 nm and which emits in the UV-C range between 230 and 280 nm.

The UV-C phosphor is basically composed of a host lattice doped with a few percent of an activator. Said host lattice always is an inorganic oxygen-containing material such as oxides, aluminates, phosphates, borates, sulphates or silicates. The activator is a metal ion selected among the group consisting of $Pr^{3+}$, $Bi^{3+}$ and $Pb^{2+}$. Suitable phosphors are $CaSO_4$:Pb, $SrSO_4$:Pb, $MgSO_4$:Pb, $(Ca,Mg)SO_4$:Pb (Ca,Mg,Sr)$SO_4$:Pb, $(Ca,Sr)SO_4$:Pb, $CaLi_2SiO_4$:Pb, $SrSiO_3$:Pb, $(Ca,Sr,Ba)SiO_3$:Pb, $Ba(Y,Gd,Lu)B_9O_{16}$:Bi, $YF_3$Bi, YOF:Bi, (Gd,Y)OF:Bi,Pr, $Y_3Al_5O_{12}$:Bi, $(Gd,Y)_3Al_5O_{12}$:Bi, $(Gd,Y)_3(Al,Ga)_5O_{12}$:Bi, $(Y,Lu)PO_4$:Pr, $(Lu,Y)BO_3$:Pr or $ScBO_3$:Pr. Particularly preferred phosphors are those which contain praseodymium, such as $LaPO_4$:Pr, $LaBO_3$:Pr, $LaB_3O_6$:Pr, $YBO_3$:Pr, $YPO_4$:Pr and $Y_2SiO_5$:Pr. Alternatively, phosphors containing bismuth may be preferred, such as $YPO_4$:Bi, $(Y,Lu)PO_4$ and $LuPO_4$:Bi.

These UV-C phosphors are preferably used in a grain size distribution in the nano-range and an average grain size of 10 to 500 nm.

The UV-C radiation-absorbing phosphor or the UV-C radiation-absorbing phosphor mixture absorbs the radiation emitted by the low-pressure mercury discharge and by the UV-C phosphor, and converts said radiation into visible light. By a suitable choice of the UV-C radiation-absorbing phosphors, the light emitted by the low-pressure gas discharge lamp can be given any desired color. In general, the UV-C radiation-absorbing phosphors and phosphor mixtures used for the invention generate white light. It may be alternatively preferred however to use UV-A phosphors as the UV-C radiation-absorbing phosphors and phosphor mixtures in order to manufacture a suntanning lamp.

Suitable UV-C radiation-absorbing phosphors are, for example, calciumhalophosphate $Ca_5(PO_4)_3(F,Cl)$:$Sb^{3+}$, $Mn^{2+}$, either alone or in a mixture with strontiummagnesiumphosphate $(Sr,Mg)_3(PO_4)_2$:$Sn^{2+}$, calciummetasilicate $CaSiO_3$:$Pb^{2+}$,$Mn^{2+}$ or magnesiumarsenate $Mg_6As_2O_{11}$:$Mn^{4+}$, strontiumhalogenphosphate $Sr_5(PO_4)_3$(F,Cl):$Sb^{3+}$ or calciumtungstate $CaWO_4$:$Pb^{2+}$ as well as the conventional three-band phosphor mixture composed of $BaMgAl_{10}O_{17}$:Eu, $CeMgAl_{11}O_{19}$:Tb or $LaPO_4$:Ce,Tb and $Y_2O_3$:Eu, either alone or in a mixture with further phosphors.

These UV-C radiation-absorbing phosphors can be prepared in an optimum grain size distribution with an average grain size of 0.5 to 10 μm. The grain size is determined by the properties of the phosphor to absorb UV radiation and absorb as well as scatter visible radiation, but also by the necessity to form a phosphor coating that bonds well to the glass wall. The latter requirement is met only by very small grains, the light output of which is smaller, however, than that of slightly larger grains.

The optimum thickness of the phosphor layer on the inner bulb lies in the range from approximately 30 to 50 nm as, on the one hand, the layer must only be so thin that still sufficient UV radiation is absorbed while, on the other hand, it must only be so thick that not too much visible radiation, formed in the inmost grains of the phosphor layer, is absorbed.

The manufacture of the phosphors is customarily carried out by means of a solid-state reaction of the starting compounds in the form of fine-grain powders having a grain size distribution between 0.5 and 1 μm.

To manufacture UV-C phosphors having a grain size in the nano-range between 10 and 1000 nm, use can be made of a sol-gel method. In accordance with a first modification of the sol-gel method, the acetates of the activator metals and, if necessary, of the metals of the host lattice are dissolved in diethyleneglycol or a diethyleneglycol-water mixture and precipitated with a compound of the anion of the phosphor. In accordance with a further modification of the sol-gel method, UV phosphors with a phosphate host lattice can be synthesized, in an organic phosphate (phosphoric acid ester) as the solvent, so as to form powders having a grain size in the nano-range.

To apply the phosphors to the walls of the gas discharge vessel use is customarily made of a flooding process. The coating suspensions for the flooding process contain water or an organic compound such as butylacetate as the solvent. The suspension is stabilized by adding auxiliary agents, for example cellulose derivatives, polymethacrylic acid or polypropylene oxide, and influenced in its rheological properties. Customarily, use is made of further additives such as dispersing agents, defoaming agents and powder conditioning agents, such as aluminum oxide, aluminum oxynitride or boric acid. The phosphor suspension is provided as a thin layer on the inside of the gas discharge vessel by pouring, flushing or spraying. The coating is subsequently dried by means of hot air and burnt in at approximately 600° C. The layers generally have a thickness in the range from 1 to 50 μm.

If an AC voltage is applied to the electrodes, an electric gas discharge can be ignited in the gas filling containing mercury and argon. As a result, a plasma is formed comprising gas atoms or molecules that are excited or ionized. When the atoms return to the ground state, as occurs when electrons and ions are recombined, a more or less substantial part of the potential energy is converted into UV radiation having wavelengths of 104 nm (Ar), 106 nm (Ar), 185 nm (Hg), 254 nm (Hg) and into visible radiation.

This conversion of electron energy into UV radiation takes place very efficiently in the mercury low-pressure gas discharge.

The generated VUV photons having a wavelength of 104 nm (Ar), 106 nm (Ar) and 185 nm (Hg) are absorbed by the UV-C phosphor and the excitation energy is released again in the longer UV-C wavelength range of the spectrum. The absorption coefficient of the phosphors activated with $Pb^{2+}$, $Bi^{3+}$ or $Pr^{3+}$ is very high for the wavelengths in the VUV range of the spectrum, and the quantum yield is high. The host lattice influences the exact position of the energy level of the activator ion and hence the emission spectrum.

The UV-C radiation is incident on the phosphor layer containing the phosphor that can be excited by UV-C radiation, thereby exciting said phosphor so as to emit visible radiation.

EXAMPLE 1

To manufacture the UV-C phosphor $YPO_4$:Bi having an average grain size of 15 nm, 300 ml tris(ethylhexyl) phosphate were rinsed with dry nitrogen and subsequently a solution of 10.0 g $YCl_3$ and 0.16 g $BiCl_3$ in 100 ml methanol was added. After methanol and water were distilled off at 40° C. under vacuum, a freshly prepared solution of 6.0 g crystalline phosphoric acid in a mixture of 150 ml tris (ethylhexyl)phosphate and 65.5 ml trioctylamine were added. The clear solution was subsequently heated to 200° C. for 2 hours. After cooling to room temperature, a transparent colloid was obtained to which methanol was added in a quantity four times that of said transparent colloid, after which the phosphor precipitates in a crystalline manner. The phosphor is removed by centrifuging, washed with methanol and dried. A quantity of 9.0 g $YPO_4$:Bi (1 mol %) is obtained. Said $YPO_4$:Bi is crystalline and has an average grain size of 15 nm.

For the layer comprising phosphors that can be excited by UV-C radiation, $BaMgAl_{10}O_{17}$:Eu, $CeMgAl_{11}O_{19}$:Tb and $Y_2O_3$:Eu were suspended in butylacetate with a dispersing agent and applied to the inside of a prepared lamp bulb of standard glass by means of a flooding method. In addition, 10 ml of a solution of $YPO_4$:Bi in butylacetate with nitrocellulose as a binder were applied to the first phosphor layer and dried so as to form a 500 nm thick layer that was subsequently burnt out at approximately 400° C.

The coated lamp bulb and the ballast and the starter are jointly mounted on a common base in a customary manner.

By providing the lamp with the UV-C phosphor $YPO_4$:Bi coating in addition to the conventional three-band phosphor coating, a low-pressure mercury discharge lamp having an increased long-term stability of the light output and the color point is obtained.

EXAMPLE 2

To manufacture the UV-C phosphor $LaPO_4$:Pr, a quantity of 5.0 g $La(Ch_3COO)_3$ and 0.5 g $Pr(CH_3COO)_3$ were dissolved in 50 ml diethyleneglycol and heated to 140° C. A solution of 2.5 g $(NH_4)_2HPO_4$ in 50 ml diethyleneglycol was added to this solution. Subsequently, this was heated to 180° C. and maintained at this temperature for 4 hours. After cooling, the phosphor was removed by centrifuging. To completely remove the diethyleneglycol, a resuspension process using ethanol or water is carried out twice after which a centrifuging process is carried out again. Finally, the phosphor is dried at 120° C. A quantity of 3.7 g $LaPO_4$:Pr (1 mol %) is obtained. The phosphor is nanocrystalline and has an average particle size of 60 nm.

For the layer with phosphors that can be excited by UV-C radiation, $Ca_5(PO_4)_3(F,Cl)$:Sb,Mn was suspended in butylacetate with a dispersing agent and applied to the inside of the prepared lamp bulb of standard glass by means of a flooding process. In addition, 10 ml of a solution of $LaPO_4$:Pr in butylacetate with nitrocellulose as the binder were applied to the first phosphor layer and dried so as to form a 500 nm thick layer that was subsequently burnt out at approximately 400° C.

The coated lamp bulb and the ballast and the starter are jointly mounted on a common base in a customary manner.

By providing the lamp with the UV-C phosphor $LaPO_4$:Pr coating in addition to the conventional halophosphate phosphor coating, a lamp having an increased long-term stability of the light output and the color point is obtained.

What is claimed is:

1. A low-pressure gas discharge lamp comprising a gas discharge vessel with a gas filling containing mercury, and comprising electrodes, means for igniting and maintaining a gas discharge, and a phosphor coating containing at least one phosphor layer and a UV-C phosphor and a phosphor that can be excited by UV-C radiation, wherein the UV-C phosphor is present in a first phosphor layer and the phosphor that can be excited by UV-C radiation is present in a second phosphor layer.

2. A low-pressure gas discharge lamp as claimed in claim 1, characterized in that the UV-C phosphor comprises an activator selected among the group consisting of $Pb^{2+}$, $Bi^{3+}$.

3. A low-pressure gas discharge lamp as claimed in claim 1, characterized in that the UV-C radiation-emitting phosphor comprises $Pr^{3+}$ and $La^{3+}$.

4. A low-pressure gas discharge lamp as claimed in claim 1, characterized in that the UV-C phosphor comprises $Pr^{3+}$ and $Y^{3+}$.

5. A low-pressure gas discharge lamp as claimed in claim 1, characterized in that the UV-C phosphor is selected among the group consisting of $LaP_4$:Pr, $LaBO_3$:Pr, $LaB_3O_6$:Pr, $YBO_3$:Pr, $YPO_4$:Pr and $Y_2SiO_5$:Pr.

6. A low-pressure gas discharge lamp as claimed in claim 1, characterized in that the UV-C phosphor is selected among the group consisting of $YPO_4$:Bi and $LuPO_4$:Bi.

7. A low-pressure gas discharge lamp as claimed in claim 1, characterized in that the phosphor that can be excited by UV-C radiation contains an activator selected among the group consisting of Ce(III), Th(III), Eu(II), Mn(II) and Sb(III).

8. A low-pressure gas discharge lamp as claimed in claim 1, characterized in that the UV-C phosphor is a phosphor whose absorption maximum lies in the VUV range between 105 and 200 nm and which emits in the UV-C range between 230 and 280 nm.

9. A low-pressure gas discharge lamp as claimed in claim 1, characterized in that the UV-C phosphor has a grain size of 10 nm<d<500 nm and is present in a first phosphor layer, and the phosphor that can be excited by UV-C radiation is present in a second phosphor layer.

* * * * *